Figure 1:
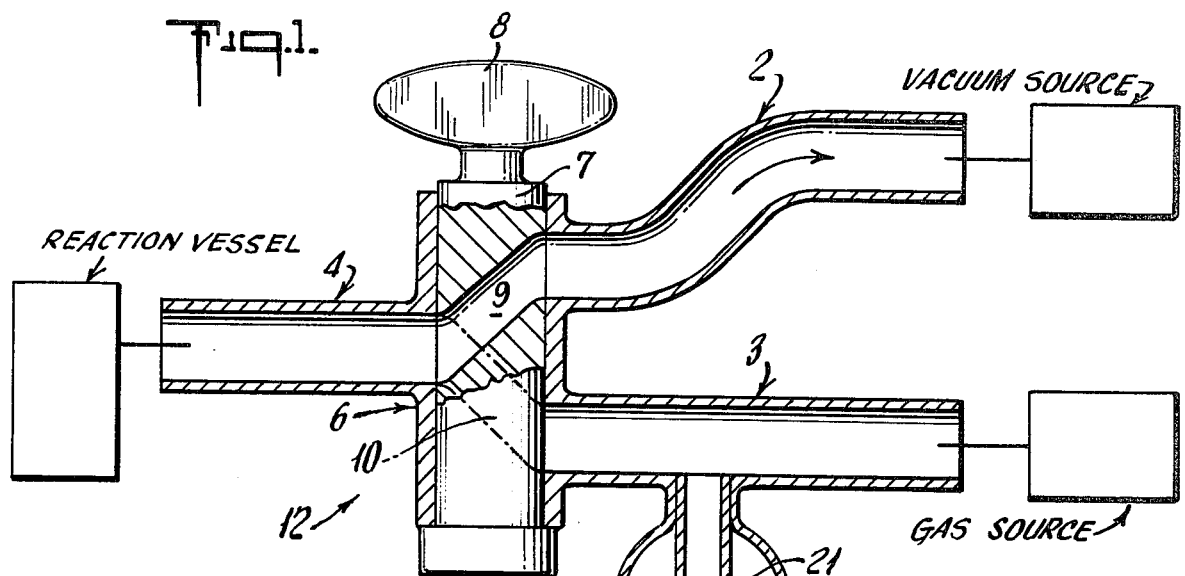

United States Patent [19]

Firestone

[11] 4,131,129

[45] Dec. 26, 1978

[54] DEVICE FOR CONTROLLING GAS FLOW INTO VESSELS

[76] Inventor: Raymond A. Firestone, 60 Hunter Ave., Fanwood, N.J. 07023

[21] Appl. No.: 785,036

[22] Filed: Apr. 6, 1977

[51] Int. Cl.² ............................................. F16K 17/02
[52] U.S. Cl. ............................... 137/596.12; 137/251; 137/528
[58] Field of Search ............... 137/247, 251, 253, 254, 137/252, 511, 527, 527.6, 528, 529, 596.12, 14, 247.23, 247.35

[56] References Cited

U.S. PATENT DOCUMENTS

| 194,070 | 8/1877 | Bower | 137/247.23 |
|---|---|---|---|
| 797,255 | 8/1905 | Beers | 137/433 |
| 989,359 | 4/1911 | Hibbitt | 137/251 |
| 2,178,250 | 10/1939 | Ernst | 137/251 X |
| 3,880,179 | 4/1975 | Lenz et al. | 137/14 |

Primary Examiner—Gerald A. Michalsky
Attorney, Agent, or Firm—Mario A. Monaco

[57] ABSTRACT

Device for controlling gas flow into vessels without allowing undesired gas, such as outside air, from entering the vessel.

14 Claims, 3 Drawing Figures

U.S. Patent

Dec. 26, 1978

4,131,129

DEVICE FOR CONTROLLING GAS FLOW INTO VESSELS

SUMMARY OF THE INVENTION

This invention relates to a device for controlling gas flow into a vessel without allowing undesired gas, such as outside air, from entering the vessel. More particularly, it relates to a purging valve having a pressure regulating feature thereon which allows gas to enter the vessel and prevents further gas flow into the vessel when a desired pressure is reached. This device can be used to replace the atmosphere in any otherwise closed vessel with any desired gas such as nitrogen, hydrogen, oxygen, argon, chlorine and the like.

Devices for monitoring gas flow are known such as a barometric U-shaped instrument having 76 mm. of Hg. In such a device, the desired gas flows into the vessel until the gas in the vessel reaches the desired pressure, as indicated by the height of a graduated Hg column. The operator than shuts off the gas source when the Hg reaches the desired level. The vacuum source is then turned on and the Hg moves in the U tube in the opposite direction. This procedure of alternately filling and evacuating a vessel is continued until the vessel contains substantially pure desired gas. The Hg acts as a barrier to the atmosphere to prevent air from coming into the vessel and also as a gauge of pressure in the system. The disadvantage of this device is that one must continuously watch the movement of the Hg in order to prevent the Hg from overflowing and to shut off the gas source at a desired pressure. With this type of instrument the flow of gas must be slow to avoid the Hg shooting out of the U tube device.

My device prevents the pressure in the vessel from becoming more than a predetermined amount higher than atmospheric, prevents the influx of air when the vessel is being filled with gas and yet permits the free flow of the desired gas into the vessel. Further, with my device the flow of gas can be rapid or slow and the operator need not be constantly attending the device in order to turn off the gas supply at the proper moment.

In addition to regulating the pressure of the vessel to a predetermined amount higher than atmospheric, my device when used to fill and evacuate a vessel prevents even a trace of air from entering during the instant it takes to switch from a vacuum to a gas source.

Thus, it is an object of my invention to provide a novel device capable of regulating the replacement of the atmosphere in an otherwise closed vessel with any particular gas.

It is a further object of my invention to prevent the pressure in the vessel from becoming more than a predetermined amount higher than atmospheric, and more particularly a trace higher than atmospheric.

It is a still further object of my invention to prevent the influx of air when an evacuated vessel is being filled with gas and yet permit the free flow of gas into the system, and particularly to prevent even a trace of air from entering during the instant it takes to switch from a vacuum source to the gas source.

A further object of my device is its ability to allow a rapid gas flow without danger of suddenly exceeding a predetermined desired pressure and without constant supervision.

Other objects will become apparent to those skilled in the art.

Figure 2:
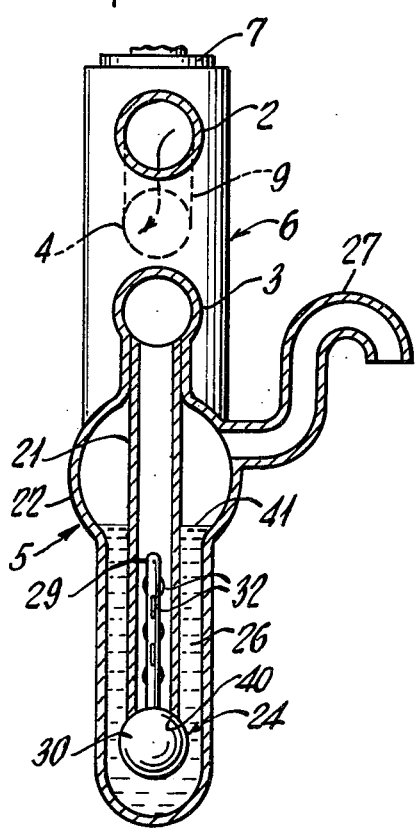
Figure 3:
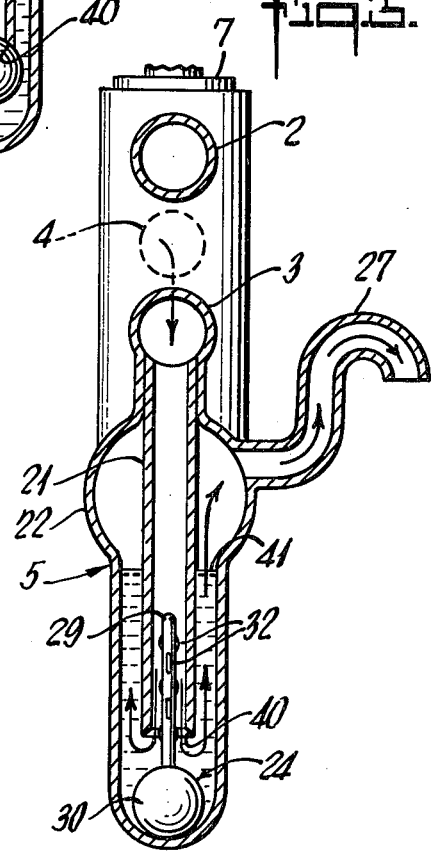

The present invention and its advantages thereof may be more fully understood by considering the accompanying drawings, wherein FIG. 1 represents a side view of a preferred embodiment of my device;

FIG. 2 represents a side view of my device with a purging valve in the closed position and FIG. 3 represents a side view of my device with the purging valve in the open position.

Referring now to FIGS. 1, 2 and 3, my purging valve 5, contains a projection 21 facing substantially downward and communicating with a gas source arm 3. Particularly, the projection 21 and gas source arm 3 form substantially a T shape.

Enclosing the projection 21, which also encloses a float 24 as later described, is an envelope 22. Envelope 22 may be attached to arm 3 generally at the same point where projection 21 leaves arm 3. Envelope 22 may also be attached to projection 21 or other convenient point, but regardless of where it is attached, it must enclose the terminal end 40 of projection 21. Envelope 22 has an outlet 27 which may merely be an opening off a section of envelope 22 above the liquid level (as hereinafter described) in envelope 22. Particularly, the opening for convenience may be at or near the top of envelope 22 and in the form of a projection or arm 27.

Located within envelope 22 is a float 24, so constructed that it is capable of forming a seal with projection 21. The float may be any object which is capable of sealing an opening of projection 21, such as a ball, cone or other shaped object including such objects as gate valves. Preferably, the float is in the form of a ball, cone or other shape which when urged against an opening of projection 21, which is below arm 3, and preferably at the terminal portion 40, forms a seal therewith and when not urged against an opening of projection 21 disengages from said opening to allow passage of gas therethrough. The float is positioned within the envelope such that it can only be urged against the opening 40 of projection 21. This can be accomplished in any known fashion. For example, the float may be of a shape and size such that the inner wall of the envelope assures proper alignment of the float with the opening of the projection. Particularly, as shown in FIGS. 1, 2 and 3, the upper end 29 of float 24 extends into the projection 21 whereas the lower end 30 of float 24 is sufficiently larger than the upper end so as to prevent its being pushed up entirely into projection 21. This extension 29 assists in keeping proper alignment.

As a particular feature, the extension 29 may have fingers 32 which keeps the float more properly aligned with the opening 40 of projection 21. Similarly, these fingers 32 may extend from the projection itself. Both the surface of float 24 and the surface of the projection which contact each other (generally at 40) can be smooth to insure a good seal. For example, when the projection and float are made of glass, those surface portions are ground smooth. Other methods for proper aligning of the float with the projection opening can be used by those skilled in the art. For example, the envelope and float can be so shaped to keep proper alignment or a tube which is extended upward or downward from the bottom of envelope 22 and aligned with projection 21 can be used as a guide for float 24. If this be the case, the float has an additional finger facing downward or upward and located within the tube. Alternatively, the float may be a gate valve hinged at one side such that it closes the end of projection 21 when in its upper position.

Also, within the envelope 22 is placed a non-reactive liquid 26 such as mercury, light oil, halocarbon oils (i.e., fluorocarbons), NUJOL, silicone, aliphatic or aromatic hydrocarbons (such as octane and benzene), water and the like and particularly halocarbon oils, light oil, mineral oil NUJOL, silicone and water but especially halocarbons. The level of the liquid 41 must be above an opening of projection 21. The force with which the float is urged against the opening 40 of projection 21 will determine how much pressure builds up in the vessel before the gas flow into such vessel is diverted by the float disengaging from the projection opening and allowing the gas to come through the projection 21, out through the liquid and eventually out through exit 27. For example, if the density of the liquid is to be used to determine the upward pressure on the float all that is needed is for the liquid to be slightly denser than the float. The greater the difference in density the greater the build up of pressure in the vessel, because more pressure is needed to move the float off its seal. The desired pressure thus can be determined by those skilled in the art. For example, I found in particular that when light oil or other liquids with a density of about 1.0 are used in conjunction with a hollow glass float only an infinitesimal pressure above atmospheric is built up in the vessel before gas flows through projection 21. As another feature of this invention, other means such as a spring mechanism can be used to urge the float against the projection. The tension of the spring will determine the build up pressure in the vessel before the gas begins to exit from projection 21. Another feature of my invention is the use of two liquids within the envelope, the denser liquid being used to urge the float against the projection opening 20, and the lighter liquid being the sealant for the opening 40.

The vessel can be filled with a gas, interchanged with other gases and/or evacuated by any known means for filling a vessel and evacuating one. For example, one may use pressurized tanks and vacuum pumps to deliver the gases and evacuate the vessel. One may use any known means such as pinch clamps, gate valves, screw valves, stopcocks and the like and preferably a 3-way stopcock shown as 42 in FIG. 1 to divert the gases and/or evacuate the vessel. This means is merely used to connect arm 4, at will, with arms 2 or 3 and accordingly any means can be used. Referring to the preferred method 42 as shown in FIG. 1, side arm 2 is connected to the vaccum source by any communicating means such as a rubber hose, glass tubing, metal pipe and the like. Side arm 3 is connected to the gas source in a fashion similar to the connection of such arm 2 with the vacuum source. Side arm 4 is connected to the vessel. Again, this connection is made by conventional means such as described above. The three arms, namely the vacuum source arm 2, the gas source arm 3 and the vessel arm 4 all terminate in a main valve housing section 6. Slidably and rotably mounted within the main valve housing is plug 7 having attached thereto handle 8 for convenient and rapid rotation.

Plug 7 has two channels, 9 and 10, ground through its body. Channel 9 connects arm 4 with arm 2 so that there is a through passage or direct communication between the vessel and the vacuum source. Channel 10 on the other hand is ground through plug 7 so that it connects arm 4 leading to the vessel with arm 3 leading to the gas source; so that there is a direct connection between arms 3 and 4. The channels 9 and 10 are in such a position in plug 7 that there can only be communication between arms 3 and 4 or arms 2 and 4 at any one time.

The following is a description of my device in operation with the preferred method used for filling and/or evacuating the vessel.

To fill the vessel with the desired gas, the vessel is evacuated first by aligning channel 9 in plug 7 to connect the vessel with the vacuum source which vacuum source may be high or low vacuum. The vessel is then connected to the gas source, for example, by aligning channel 10 with the gas source arm 3 and the vessel arm 4. Until the vessel is filled with gas, it and arms 3 and 4 are at sub-atmospheric pressure. At this time, float 24 is urged against the opening 40 of the projection 21, thus preventing inflow of atmosphere. Gas enters the vessel through channel 10 until there is less resistance of gas flow through the projection 21 than there is into the vessel. When this condition occurs, which is usually when pressure in the vessel is slightly greater than atmospheric, the gas will enter projection 21 and will force the float 24 downward off its seat. In the preferred embodiment the gas will then bubble through liquid 26 into envelope 22 and eventually out exit 27. When a transparent envelope is used one can see bubbles in liquid 26 and then one knows that the gas pressure in the reaction vessel is at the desired level. In order to insure almost total removal of the original gas in the vessel, one alternately evacuates the vessel and fills it with the desired gas by turning the plug 7 from vacuum source to gas source. The more times this is done the more complete the atmosphere in the reaction vessel will be that of the desired gas. An important advantage of this invention is that the alternate evacuation and filling with gas can be done rapidly and with minimal effort and yet despite the high speed of gas flow possible in both evacuation and filling cycles, there is no danger of suddenly overfilling the vessel. Thus, no specially close observation is necessary during either cycle. In fact, almost total exchange of the undesired for the desired gas can be achieved usually in about 10-30 seconds.

It can also be seen that my device prevents the influx of air into the vessel when the vessel is being switched from vacuum to gas intake since any air can only enter the vessel through 27 and this source of unwanted air is prevented because the float 24 at that moment is urged against the opening of projection 21, thus sealing said projection. Entry of even the most minute trace of air during the instant it takes for the float 24 to seal the opening of 21 is prevented by the liquid seal.

The material of which the device is made of is not critical and my device can therefore be made of such materials as glass, metal, plastic and the like. Glass is preferred for at least the envelope in order to be able to visually observe any gas bubbles. Furthermore, the size of the device is not critical being preferably determined by the size of the vessel. The larger the vessel, the larger the device.

It should be understood, of course, that the foregoing disclosure relates only to a preferred embodiment of the invention and that numerous modifications or alterations may be made therein by those skilled in the art without departing from the spirit and scope of the invention as set forth in the appended claims.

I claim:

1. A device for controlling gas flow into a vessel comprising:

(a) means for alternately connecting a vessel with a vacuum and gas source;
(b) a communicating means connecting said means with said gas source;
(c) a projection communicating with said communicating means and being open at its other end;
(d) a container enveloping at least a portion of said projection;
(e) a float within said container capable of sealing the open end of said projection;
(f) a liquid contained within said container and with its level above the open end of said projection; said liquid having a density such that it can urge the float into a sealing relationship with the end of said projection; and
(g) an exit means communicating with said container, said exit means being above the level of said liquid.

2. A device of claim 1 wherein the means of part (a) is a 3-way stopcock.

3. The device of claim 1 wherein the projection is substantially at right angles to said communicating means and faces downward.

4. The device of claim 1 wherein the device contains means for alignment of said float with said projection to insure sealing of the float and projection.

5. The device of claim 1 wherein the float is hollow glass and contains a ground glass surface which comes in contact with said projection.

6. The device of claim 5 wherein the surface of the projection which comes in contact with the float is ground glass.

7. The device of claim 1 wherein the float has a flared out base, and means thereon for aligning the float with the projection.

8. A device of claim 1 wherein the container has therein means for maintaining the float in proper alignment with the projection.

9. A device of claim 1 wherein the float has an extension facing upward, said extension having fingers thereon and projecting substantially at right angles from said extension.

10. A device of claim 1 wherein the liquid is selected from the group consisting of mercury, light oil, halocarbon oil, Nujol, slicone, aliphatic hydrocarbon, aromatic hydrocarbon and water.

11. A device of claim 10 wherein the liquid is selected from the group consisting of light oil, halocarbon oil, Nujol, silicone, aliphatic hydrocarbon, aromatic hydrocarbon and water.

12. A device of claim 10 wherein the liquid is halocarbon.

13. A device of claim 1 wherein the float has an extension facing a direction selected from the group consisting of downward, upward and a combination of downward and upward.

14. The device of claim 1 wherein the float is a ball.

* * * * *